Sept. 8, 1964     W. H. DANIEL     3,147,736
ANIMAL SHELTER
Filed June 26, 1963

INVENTOR.
William H. Daniel
BY Robert J. Patch
ATTY.

United States Patent Office 3,147,736
Patented Sept. 8, 1964

3,147,736
ANIMAL SHELTER
William H. Daniel, 2894 S. Utica, Tulsa, Okla.
Filed June 26, 1963, Ser. No. 290,784
8 Claims. (Cl. 119—19)

The present invention relates to animal shelters, more particularly to the dog-house type.

It is an object of the present invention to provide an animal shelter, at least a substantial proportion of the materials for which are readily available as scrap materials.

Another object of the present invention is the provision of an animal shelter which will be relatively simple and inexpensive to manufacture and assemble and rugged and durable in use.

Figure 1:
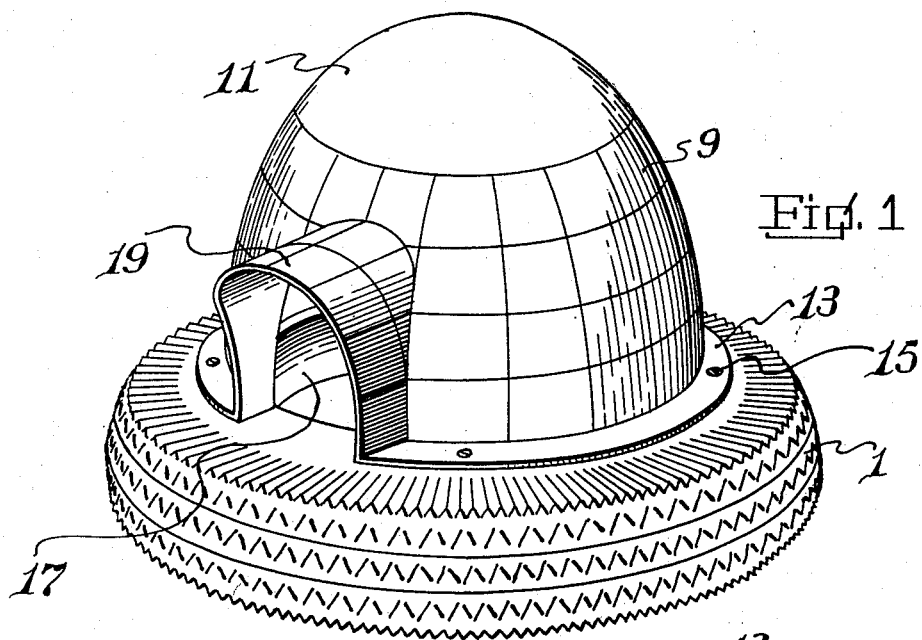
Figure 3:
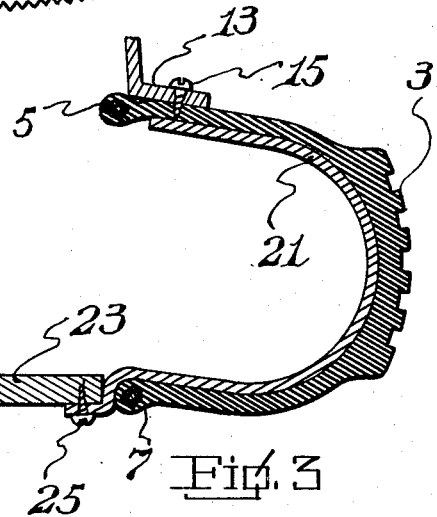
Figure 2:
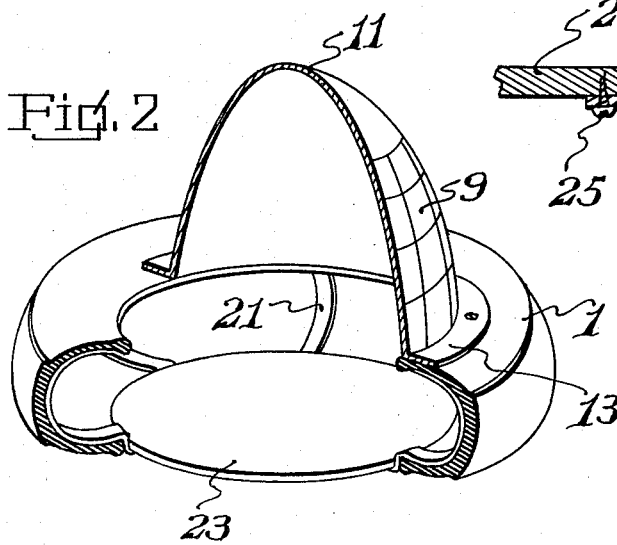

Other objects and advantages of the present invention will become apparent from a consideration of the following description, taken in connection with the accompanying drawing, in which, FIGURE 1 is a perspective view of an animal shelter according to the present invention;

FIGURE 2 is a view similar to FIGURE 1 but showing parts of the structure broken away to indicate the interior of the animal shelter; and FIGURE 3 is an enlarged fragmentary cross-sectional view through one side of the lower portion of the animal shelter of the present invention.

Briefly, the objects of the invention are achieved by employing a tire casing as a principal component of the shelter. Tire casings that have become worn to the extent that they are no longer useful are readily available and would otherwise simply be used as scrap rubber. But in the environment of the present invention they perform a unique and useful function in a number of ways, as will appear hereinafter.

Referring now to the drawing in greater detail, there is shown an animal shelter of the dog-house type. It will be understood, of course, that animals other than dogs can be sheltered; however, the principal field of use for the present invention is in the sheltering of dogs as pets. The animal shelter comprises a tire casing 1 of the automotive vehicle tire type. Tire casing 1, of course, will ordinarily not be a new tire but rather a tire that has been so badly worn or damaged that, apart from the present invention, it is no longer useful for anything other than scrap. Tire 1 has the usual outer peripheral tread 3 and is open in its center, the open center of the tire being bounded by an upper annular bead 5 and a lower annular bead 7.

A cover 9 is provided that generally covers the upper opening of the tire bounded by upper bead 5. Cover 9 is in the form of a dome 11 having a lower outwardly extending annular flange 13 that rests substantially flat against the upper portion of tire casing 1 adjacent upper bead 5. Screws 15 extend through flange 13 and down into the material of tire casing 1. Screws 15 are preferably of the type known as "metal" screws, as distinguished from "wood" screws, for the threads of metal screws are more deeply cut than the threads of wood screws and therefore metal screws fasten cover 9 more securely to tire casing 1 than would be the case if wood screws were used.

Cover 9 has a lateral opening 17 therethrough for the animal to come in and go out. The lower side of opening 17 is bounded by tire casing 1, and the remainder of opening 17 is bordered by an outwardly extending flange 19, the opening 17 and flange 19 and the subjacent portion of tire casing 1 comprising the doorway of the animal shelter.

Braces 21 are disposed inside tire casing 1 to urge beads 5 and 7 apart and to increase the room for the animal within tire casing 1. Braces 21 in the illustrated embodiment are in the form of curved straps that conform generally to the curvature of the inside of tire casing 1 in a spread position of the casing. However, it will of course be understood that braces 21 can be in the form of straight straps that bridge across the space between beads 5 and 7 or can have any of a variety of other configurations so long as they do the job of urging beads 5 and 7 apart. When braces 21 are curved and are fitted within the curvature of tire casing 1, they occupy a minimum of room as compared to braces that bridge across open spaces within the tire casing and which to some extent limit the freedom of movement of the animal within the shelter.

The animal shelter is also provided with a floor 23 that substantially closes the lower opening of the tire casing. Floor 23 may of course be of any of a variety of materials such as wood, fiber board, plastic, metal or the like. If desired, floor 23 can be made in a plurality of sections for ease of insertion through the openings encompassed by beads 5 or 7. Wood screws 25 pass through the lower ends of braces 21 and into floor 23 thereby to secure braces 21 and floor 23 in unitary assembly with each other. To this end, it will be noted that in the illustrated embodiment, brace 21 in FIGURE 3 bends around the lower bead 7 and then bends in a reverse direction to fit under the outer edge of floor 23. However, there are many other ways of arranging braces 21 and floor 23 relative to each other, as by causing braces 21 to dig sharp ends both into floor 23 and into the upper underside of tire casing 1. In any event, however, it is preferable that braces 21 and floor 23 be so related to each other and so interconnected that floor 23 provides a rigid frame from which braces 21 extend, to the end that braces 21 are held against misalignment by means of floor 23.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. An animal shelter comprising a tire casing as a base for the shelter, and a cover secured to the tire casing, the cover defining an opening through which the animal may enter and leave the shelter, the cover bounding the top and the casing bounding at least a portion of the sides of a continuous free space for the animal within the shelter.

2. An animal shelter as claimed in claim 1, the cover being in the form of a hollow dome that opens downwardly into the space bounded by the tire casing.

3. An animal shelter as claimed in claim 1, the tire casing defining the lower marginal edge of the opening.

4. An animal shelter as claimed in claim 1, the casing having a pair of spaced parallel annular beads exposed to the interior of the shelter, and brace means within the casing maintaining the beads spaced apart.

5. An animal shelter as claimed in claim 1, and floor means in a lower portion of the casing and substantially closing the lower opening of the casing.

6. An animal shelter as claimed in claim 5, the casing having a pair of spaced parallel annular beads, and brace means within the casing maintaining the beads spaced apart, the brace means being secured to the floor means.

7. An animal shelter as claimed in claim 1, the cover having a lower annular edge secured to the upper side of the casing.

8. An animal shelter as claimed in claim 1, the casing having a pair of spaced parallel annular beads exposed to the interior of the shelter.

References Cited in the file of this patent

UNITED STATES PATENTS

| | | |
|---|---|---|
| 2,530,485 | Shannon | Nov. 21, 1950 |
| 2,592,638 | Andrew | Apr. 15, 1952 |
| 2,974,633 | Whidden | Mar. 14, 1961 |
| 3,007,443 | Ryan | Nov. 7, 1961 |